Feb. 14, 1961     E. K. GATCOMBE     2,971,364
APPARATUS AND METHODS FOR CALIBRATING MOTION TRANSDUCERS
Filed Feb. 8, 1956
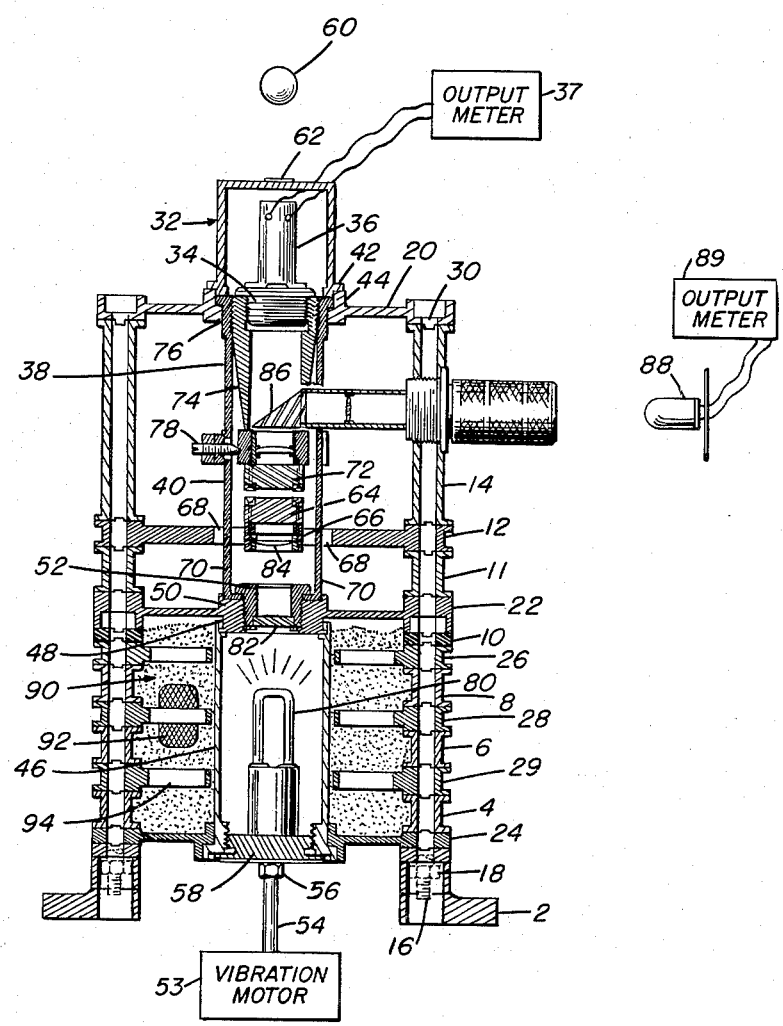
INVENTOR.
Ernest K. Gatcombe
BY
ATTORNEYS United States Patent Office  2,971,364
Patented Feb. 14, 1961

2,971,364
APPARATUS AND METHODS FOR CALIBRATING MOTION TRANSDUCERS

Ernest K. Gatcombe, R.R. 2, Box 222, Carmel, Calif.

Filed Feb. 8, 1956, Ser. No. 564,332

9 Claims. (Cl. 73—1)

(Granted under Title 35, U.S. Code (1952), sec. 266)

The invention described herein may be manufactured and used by or for the Government of the United States of America for governmental purposes without the payment of any royalties thereon or therefor.

This invention relates to apparatus and methods for calibrating motion transducers and more specifically to methods and apparatus using changes in the condition of an optical interference pattern, occurring in unison with the motion of a transducer to be calibrated, to determine the motion of the transducer.

Prior art apparatus and methods commonly employed to calibrate displacement pick-ups, velocity pick-ups and accelerometers usually used the determination of amplitude relationships for the output calibration of these instruments, generally employing a shaker table to provide the pick-up motion. These methods and apparatus suffer the disadvantage that only approximate results are obtainable, as is evidenced by the fact that the United States Bureau of Standards has never agreed upon a standard calibrator or a standard method of calibration. Furthermore, under the prior art practice only steady state calibrations were made. Quite often the pick-up unit would be employed under non-steady state conditions with obvious discrepancies in results.

A principal object of the present invention is to provide methods and apparatus for calibrating motion transducers wherein the calibration depends on the measurement of frequencies rather than amplitude, the invention being thus capable of great accuracy since frequencies can easily be measured with great accuracy.

Other objects and many of the attendant advantages of this invention will be readily appreciated as the same becomes better understood by reference to the following detailed description when considered in connection with the accompanying drawing wherein the single figure represents an elevation view in cross section of a preferred embodiment of the apparatus of this invention.

The preferred embodiment of the apparatus comprises essentially a guided platform upon which a transducer is placed for calibration; a set of guide springs for guiding the motion of the platform; a drive rod connected to a vibration motor for vibrating the platform; a central column for transmitting motion from the drive rod to the spring system and platform; an interferometer system including a fixed optical plate and a second optical plate movable in unison with the transducer to vary the interference pattern produced in accordance with the motion of the transducer and means for viewing the interference pattern and yielding a signal responsive to its changes; and a set of auxiliary springs which can be coupled individually to the vibrating system to vary its natural frequency.

Reference is now made to the drawing. The apparatus comprises a base made up principally of a pedestal 2 which can be anchored to any suitable foundation by convenient means such as bolts (not shown), and a plurality of cylindrical spacers 4, 6, 8, 10, 11, 12, and 14 firmly held together among themselves and with the pedestal by a plurality of bolts 16 with corresponding nuts 18, only a small portion of the bolts being shown for clarity. The bolts 16 pass through circumferentially spaced corresponding holes in the spacers. A plurality of centrally symmetrical springs are provided for insuring rectilinear motion of a transducer. These springs could be in various forms, such, for example, as elliptical plates or the like but most conveniently are made as circular plates or disc springs of which 20, 22, and 24 are designated as guide springs and 26, 28, and 29 are designated auxiliary springs. All the disc springs are fixed adjacent their peripheries to the base, being clamped by the bolts 16 and held snugly between the spacers by annular tongue and groove arrangements such as 30. A motion transducer housing generally indicated at 32 includes a support 34 for supporting a transducer 36 to be calibrated. An output meter 37 may conveniently be connected to measure and indicate the output of the transducer 36. The output meter can have scales calibrated in any or all such convenient quantities as acceleration, velocity, frequency, voltage, etc. The support and housing are fixed to the disc spring 20 and moved in unison therewith when the system is vibrated by the motion of a central drive column generally indicated at 38.

The drive column comprises an upper cylinder 40 clamped to the central region of the spring 20 by any convenient means such as bolts (not shown) extending through the flange 42 of the housing 32 into the shoulder 44 of the spring 20; and a lower cylinder 46 joined to the upper cylinder by virtue of being threadedly connected at 48 to the central collar portion 50 of the spring 22. The collar portion of the spring 22 thus serves, in effect, as a part of the central drive column, the lower end of the upper cylinder 40 being clamped thereto by the retainer 52 through its threaded engagement with the collar portion 50.

The vibratory system can be driven continuously by any suitable vibration motor shown schematically at 53 connected as by means of drive rod 54 to the central drive column as by attachment at 56 to the plug 58 forming the bottom of the lower cylinder 46. A preferred type of vibration motor to be connected to the drive rod is one of the type manufactured by the Westinghouse Electric Corporation which consists essentially of a coil placed in a uniform magnetic field. This coil is fixed rigidly, by means of a spider, to the drive rod. When alternating current is passed through this drive coil, the coil oscillates in the magnetic field and develops a force which is applied to the rod. The general structure is somewhat similar to a loudspeaker wherein the voice coil corresponds to the drive coil of the vibration motor. The preferred vibration motor is supplied with power from the output of a continuously variable frequency audio oscillator suitably amplified. Since, for reasons hereinafter explained, it is desirable to vibrate the mechanical system already described near its natural frequency of oscillation, means are provided on the preferred vibration motor to permit this operation. This consists of a pick-up coil wound on top of the drive coil. From the output of the pick-up coil it can be determined when the system is vibrating at its natural frequency.

For obtaining the transient response of the system a falling weight 60 is used, giving an impulse to the system as it lands on the anvil 62 at the top of the housing 32.

To detect the motion of the system in vibration an interferometer unit is provided including a pair of interference-pattern-forming plates illuminated by a suitable source of light and observed by some suitable light-sensitive device. As will appear, this motion-detection arrangement constitutes means for producing a signal whose frequency is directly proportional to the instantaneous speed of the vibrating system. The first plate 64 of the pair is fixed relative to the base of the device, being held in a holder bolted to the central hub portion 66 of the spacer 12. This hub portion 66 is carried by radially extending fingers of the disc spacer 12 created by forming slots 68 in the disc 12 conveniently in the shape of truncated sectors. These slots are formed for the purpose of enabling the lower portion of the upper cylinder 40 to pass through the disc 12 in order to be joined to the spring 22. The cylinder 40 is for this purpose provided with longitudinally extending fingers of such a size as to fit readily through the slots 68. These fingers, indicated at 70, are formed by providing longitudinal slots in the lower portion of the cylinder 40. Since the cross section shown in the drawing passes longitudinally through the fingers 70, of which there are conveniently four, the cross-hatching lines are continuous and the walls of the longitudinal slots are not visible. The second plate of the pair of interference-pattern-forming plates is shown at 72 being held in a holder 74 threaded at 76 into the upper cylinder. Preferably three circumferentially spaced adjustment screws, of which one is shown at 78, are used for adjusting the position of the plate 72 relative to the plate 64. The plates 64 and 72 can be of any type suitable for producing an interference pattern whose changing condition can be readily observed. Conveniently the plates 64 are both optical flats and are semi-silvered on their adjacent surfaces to produce an interference pattern in the form of concentric rings known as Haidinger fringes. Preferably the plates are illuminated by parallel monochromatic light provided by a mercury arc source 80 passing through a filter 82 and a collimating lens 84. The pattern is transmitted through an additional optical system including prism 86 and thence to a photocell 88. An output meter shown schematically at 89 can be connected to measure and indicate the output of the photocell 88. The output meter can have scales calibrated in any or all such useful quantities as voltage, frequency, etc.

The vibratory system thus far described contains only the three springs 20, 22, and 24. To add the auxiliary springs 26, 28, and 29 to the system to change its natural frequency of vibration, means are provided for selectively coupling each spring individually and independently of the others to the moving assembly. These means are conveniently embodied in a magnetic clutch arrangement wherein the discs are each magnetizable as an electromagnet and are coupled at their central region to the drive column (which is of steel, iron, or the like) by means of magnetizable particles such as iron particles indicated generally at 90 interposed in the magnetic flux path between the spring and the drive column. The clutch arrangement is energized by electric current sent through coils such as 92 (of which only one is shown for the sake of clarity) mounted on generally radially extending fingers formed on the discs by slotting the discs as at 94 roughly in the manner of an A.C. series electric motor field lamination.

*Operation*

To use the illustrated embodiment of the apparatus of this invention, a motion transducer which it is desired to calibrate is mounted as at 36. The vibration motor connected to the drive rod 54 is energized. It is desired to vibrate the system including the transducer in as nearly a purely sinusoidal motion as possible because then the mathematical analysis of it is the simplest. This is accomplished by operating the system just slightly below its natural frequency of vibration. This is achieved by varying the frequency of the vibration motor through a range while the amplitude of oscillation of the system is observed by the use, for example, of a pick-up coil on the driving motor itself. When the amplitude of vibration, as indicated by the output of the pick-up coil built into the vibration motor, is at maximum, the natural frequency of the system has been attained. The operating frequency is preferably kept below the natural frequency for best stability i.e. to avoid disturbing transients. For all practical purposes the system can then be regarded as operating sinusoidally.

As the transducer to be calibrated is given a displacement, the plate 72 moves in unison with it relative to the fixed plate 64. As the plates are displaced relative to one another the interference pattern, constituted in this case by Haidinger fringes, changes accordingly. A displacement of one-half the wavelength of the light used will cause the central spot of the light interference pattern to undergo a complete change from either bright to dark or vice versa. Conveniently it is this central spot of the set of Haidinger concentric interference rings which is focused on the photocell 88, although other portions of the fringe pattern could be used as well. The photocell will respond to the change in intensity of the light of the central dot of the interference pattern and will emit corresponding electric signals. For example, a change of intensity from dark to bright can be regarded as furnishing the photo tube with an energy pulse and the number of these pulses appearing in the output of the photo tube per unit time will give an indication of the motion of the assembly and hence of the transducer to be calibrated. The results are most easily usable when the two flat plates 72 and 64 are oriented parallel to one another at all times during their relative motion. The screws 78, which move with the central drive column, are used for adjusting the plate 72 to insure initial parallel orientation of the flats relative to one another. The general design of the structure with its centrally symmetrical springs insures that the motion of the plate 72 is rectilinear relative to the plate 64 and therefore that, with the initial adjustment of the pair of plates into parallelism, the plates will remain parallel during their relative motion. It may be noted that the output from the photo tube will clearly indicate whether or not this desired motion is being achieved.

Since the photo tube receives a series of energy pulses as the flats approach and recede from each other, the photo tube is receiving what amounts to cyclically varying energy input, the frequency of which, in the case of sinusoidal vibration of the system, approaches a minimum as the vibrating system reaches the peak of its amplitude and approaches a maximum as the vibrating system passes through the mid-point of its travel. The highest rate at which the photo tube receives energy pulses (and hence the highest frequency of its output) can be determined in any convenient way as, for example, by beating the output frequency against a known frequency. As will appear from the following equations, the maximum displacement, maximum velocity, and maximum acceleration experienced by a transducer mounted for vibration in the apparatus can be readily determined from the measurement of the maximum frequency of the photo tube's signal plus two other quantities both of which are easily measurable with great accuracy, namely, the frequency of vibration of the transducer (which is the frequency of vibration of the system) and the wavelength of the light used to produce the optical interference patern. The equations showing the relations between the motion of the transducer being calibrated and the other pertinent quantities are:

$$D = \frac{f_{\text{max. photo.}} \lambda}{4\pi f_{\text{transducer}}}$$

$$V = f_{\text{max. photo.}} \lambda/2$$

$$A = f_{\text{max. photo.}} \pi \lambda f_{\text{transducer}}$$

where $D$ = maximum displacement of transducer
$V$ = maximum velocity of transducer $A$ = maximum acceleration of transducer
$f_{max.\ photo.}$ = maximum frequency of the output signals from photocell
$f_{transducer}$ = frequency of vibration of transducer
$\lambda$ = wavelength of light used in interference pattern.

The quantity $f_{max.\ photo.}$ is obtained in the manner hereinbefore described. The quantity $f_{transducer}$ being the frequency of vibration of the system, which is the frequency of vibration of the transducer, the vibration motor furnishing the motion, and the moving plate of the interferometer, is obtained either from the oscillator connected to the vibration motor or, conceivably, from the frequency of the output of the transducer being calibrated. It may be noted that usually the frequency output of a transducer can be relied upon although its displacement, velocity, or acceleration output may require calibration. The wavelength of light is already very well known to great accuracy.

When it is desired to vary the natural frequency of vibration of the assembly to check additional points on the calibration curve of the transducer, one or more of the auxiliary springs 24, 26, and 28 are coupled to the drive column by energizing their respective electromagnet coils.

The appropriate motion (i.e. displacement, or velocity, or acceleration) of the particular motion transducer being calibrated is calculated from the appropriate one of the three preceding equations for various frequencies of vibration. The results given by the calculation are checked against the corresponding recorded readings of the output of the transducer at these frequencies, and thus the transducer is calibrated or a calibration curve can be constructed.

Although the preceding equations are developed on the basis of sinusoidal motion for the transducer, other characteristic motions can be used, such, for example, as might be achieved by impressing a square wave or other desired wave form of voltage on the vibration motor.

For transient responses the drive rod and its associated vibration motor are disconnected from the apparatus and the falling weight 60 is dropped on the anvil 62. In a manner analogous to the calibration of a transducer under steady state vibration, the transducer is calibrated under transient conditions by calculating the appropriate displacement, velocity, or acceleration from the pertinent equation on the basis of photocell output resulting from the impact of the weight, and this is compared with the corresponding readings of the output of the transducer.

*The methods of the invention*

From the foregoing description of a preferred embodiment of the apparatus of this invention and the operation thereof the methods of the invention can be readily understood. A preferred method of calibrating a motion transducer according to the invention comprises essentially the steps of vibrating the transducer substantially sinusoidally at a given frequency; measuring the given frequency; producing an optical interference pattern with monochromatic light and varying the condition of the interference pattern directly in accordance with the vibration of the transducer; and measuring the frequency of variation of the condition of the interference pattern. The maximum displacement, velocity, and acceleration of the transducer are then readily calculable from the information gathered in the practice of this method by using the appropriate equations set forth hereinbefore. To complete the calibration, the calculated values are compared with the recorded values of the readings of the transducer at the corresponding vibration frequencies. The method, of course, comprehends vibration of the transducer either in a steady state condition, as by a vibration motor, or in a transient condition, as under the impact of a falling weight.

As previously described in connection with the operation of the apparatus, although the use of sinusoidal motion of the transducer renders the calculations rather simple, other characteristic motions of the transducer can be used such, for example, as might be obtained by impressing on the vibration motor a square wave or some other wave form.

From the foregoing description it is apparent that the present invention provides very useful and accurate methods and apparatus for calibrating motion transducers depending on the measurement of frequencies which are quantities that can be easily measured with great accuracy. The invention further provides for a simple and convenient means for varying the natural frequency of vibration of the system used to vibrate the transducer under calibration. The apparatus is simple designed with a minimum of parts arranged symmetrically about a central axis to insure a maximum accuracy of motion of all the moving parts.

Although circular disc springs are shown in the preferred embodiment, other types of supports could be used, such, for example, as elliptical plates, so long as they are preferably centrally symmetrical so as to insure rectilinear motion of the transducer and moving optical flat. The interferometer unit is shown conveniently as made up of a pair of optical flats whose interference pattern is observed with transmitted light. However, other interferometer units could be used. For example, a unit could be used in which the pattern is observed by reflected light instead of transmitted light. Also a unit could be used in which one of the plates is curved either convexly, as in the case of Newton's ring apparatus, or concavely.

Obviously many other modifications and variations of the present invention are possible in the light of the above teachings. It is, therefore, to be understood that within the scope of the appended claims the invention may be practiced otherwise than as specifically described.

What is claimed is:

1. A motion transducer calibrator comprising a base; a disc spring carried by said base and fixed thereto adjacent its periphery for vibratory flexing in the direction transverse to its plane; a transducer housing adapted to house a transducer to be calibrated and fixed to said disc spring to vibrate therewith; a pair of interference-pattern-forming plates, one of said plates being fixed to said base and the other of said plates being fixed to move in unison with said disc spring and said transducer housing; a light source arranged to illuminate said plates to produce an interference pattern; a photocell disposed to view said interference pattern whereby its output is responsive to the condition of said pattern; means including a central drive column and a plurality of auxiliary disc springs substantially spaced from and supported and oriented in a manner similar to said first disc spring for causing said housing, and hence said transducer to be calibrated, to vibrate at a known predetermined frequency; means for measuring the output of said transducer; and means for measuring the output of said photocell; the maximum displacement, velocity, and acceleration of the transducer housing being determinable from the known wavelength of light from the light source, the maximum frequency of the output signal of said photocell, and the frequency of vibration of the vibratory systems.

2. A device of the character described comprising a base; a support adapted to support a motion transducer and mounted for substantially rectilinear displacement relative to said base; spring means interposed between said support and said base; means for applying force to said support to displace the same in opposition to the force of said spring means; and means for producing an output signal whose frequency is directly proportional to the instantaneous speed of said displacement.

3. The device of claim 2 wherein said last named means include a pair of interference-pattern-forming plates of which one is fixed relative to said base and the other is constrained to move with said support; a light source directed against said plates to from an interference pattern; and photocell means for observing said pattern.

4. A device of the character described comprising a base; a plurality of axially spaced disc springs fixed to said base at their peripheries; a drive column coaxial with the axis of said springs and supported by at least some of said springs; a motion transducer support carried by said drive column; a pair of interference-pattern-forming plates one of which is fixed relative to said base and the other of which is carried by said drive column to move in unison therewith; means for illuminating said plates to form an interference pattern; photocell means for observing said pattern; and drive means placing said drive column into reciprocation.

5. The device of claim 4 wherein said drive means includes a vibration motor of controllable frequency.

6. The device of claim 5 including means for selectively coupling certain of said disc springs individually to said drive column whereby to vary the natural frequency of the vibratory system.

7. The device of claim 6 wherein said selective coupling means includes means for controllably magnetizing said certain disc springs, and magnetizable particles interposed in the magnetic flux path between said certain disc springs and said drive column.

8. The method of calibrating a motion transducer which comprises the steps of vibrating the transducer substantially sinusoidally at a given frequency; measuring the given frequency; producing a signal whose frequency is directly proportional to the instantaneous speed of the vibrating transducer; and measuring the frequency of said signal; the maximum displacement, velocity, and acceleration of the transducer being determined as a function of the frequency of vibration of the transducer and the maximum frequency of said signal.

9. The method of calibrating a motion transducer which comprises the steps of vibrating the transducer substantially sinusoidally at a given frequency; measuring the given frequency; producing an optical interference pattern with monochromatic light, the condition of the pattern being varied directly with the vibration of the transducer; and measuring the frequency of variation of the condition of the interference pattern; the maximum displacement, velocity, and acceleration of the transducer being determined as a function of the frequency of vibration of the transducer, the wavelength of the light forming the interference pattern, and the maximum frequency of change of condition of the interference pattern.

References Cited in the file of this patent

UNITED STATES PATENTS

| | | |
|---|---|---|
| 1,625,625 | Richer | Apr. 19, 1927 |
| 2,343,063 | Kent | Feb. 29, 1944 |
| 2,527,338 | Stamm | Oct. 24, 1950 |
| 2,648,979 | Cornett | Aug. 18, 1953 |

FOREIGN PATENTS

| | | |
|---|---|---|
| 443,184 | Great Britain | Feb. 24, 1936 |

OTHER REFERENCES

Publication: Geophysics, v. 28, #1, January 1953, pp. 160–168, article by P. Honnell, "An Electromechanical Transducer System for Transient Testing of Seismographs" (73–1).

Publication: Article by Honnell, "Electronic Shake Table," Electronics, June 1954, pages 178, 179. (Copy in 73–1.)

Publication: Instruments and Automation, v. 28, September 1955, pp. 1510–1512, "Microscope Technique for Accelerometer Calibration" by A. Kaufman et al. (73–1)

Kaufman et al. (B), "Shaketable Ratings and Accelerometer Calibrations," Radio-Electronic Engineering, vol. 24, No. 2, February 1955, pages 7–9, 36 and 37, received in U.S. Patent Office, Jan. 24, 1955. (Copy in Scientific Library.)